Oct. 31, 1967 J. LADONICZKI ET AL 3,349,964
ELECTRICALLY HEATING AND DISPENSING A METERED
QUANTITY OF FLUENT MATERIAL
Filed Aug. 19, 1965 6 Sheets-Sheet 2

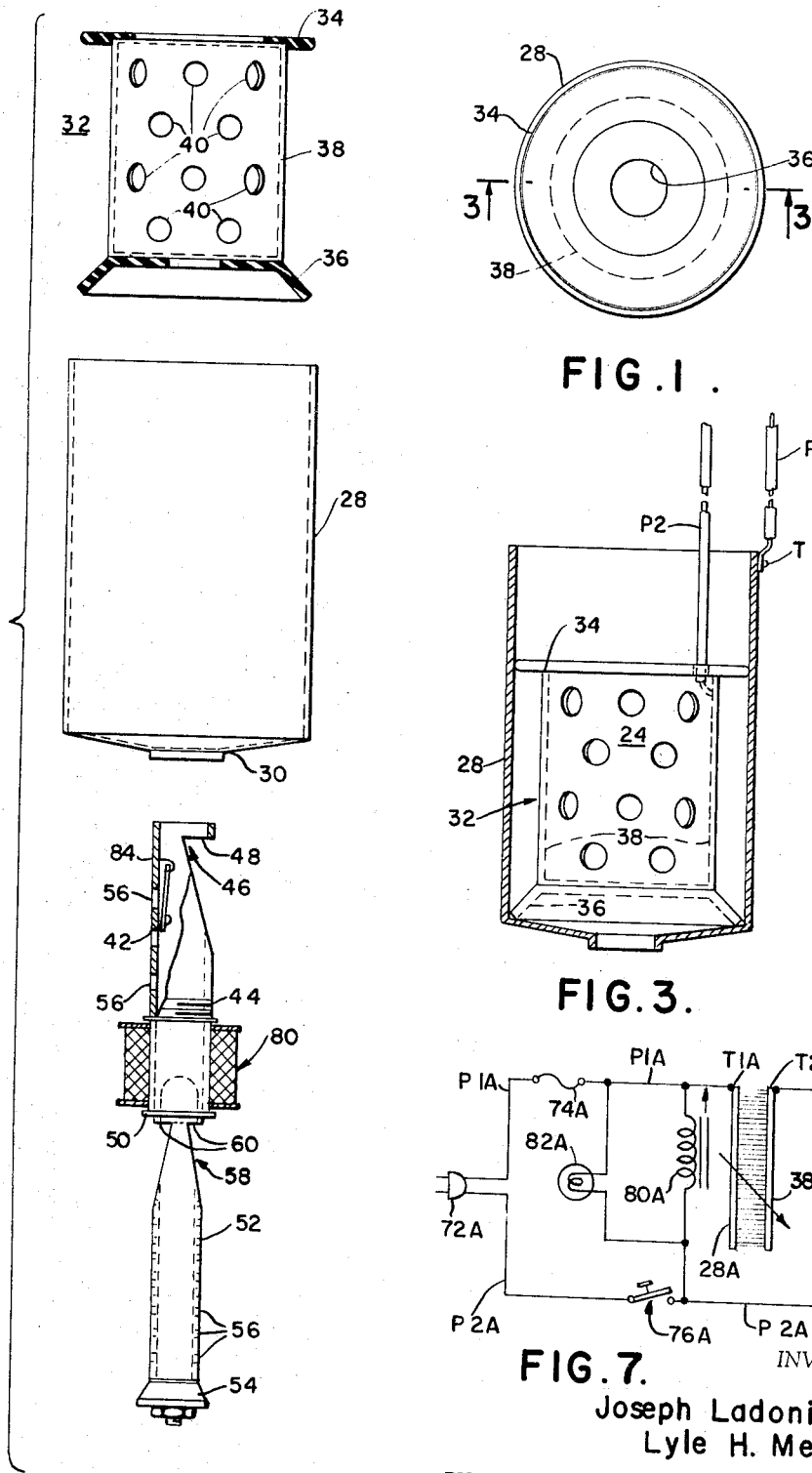

INVENTORS
Joseph Ladonicski &
Lyle H. Meyer

BY Birch and Birch
ATTORNEYS

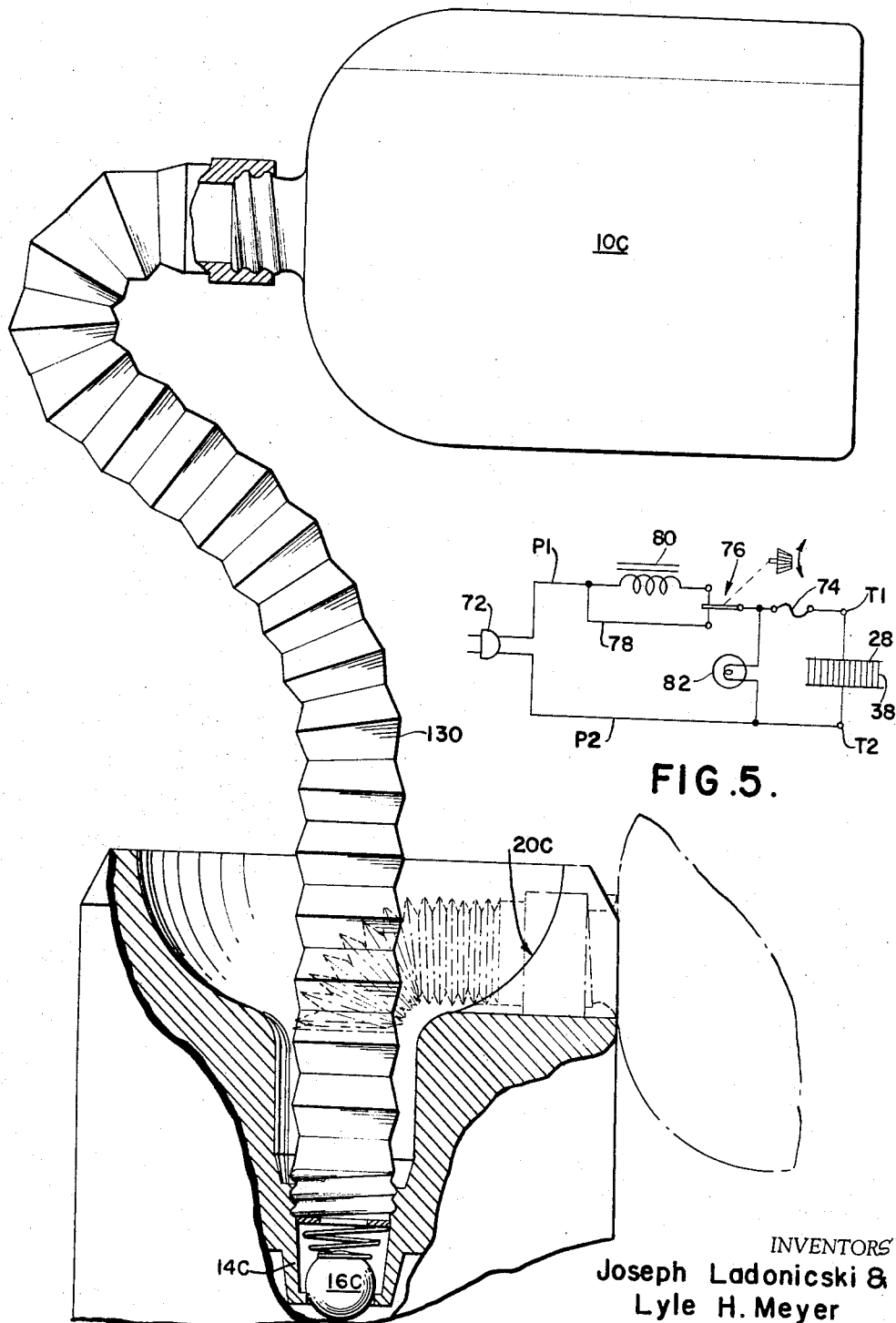

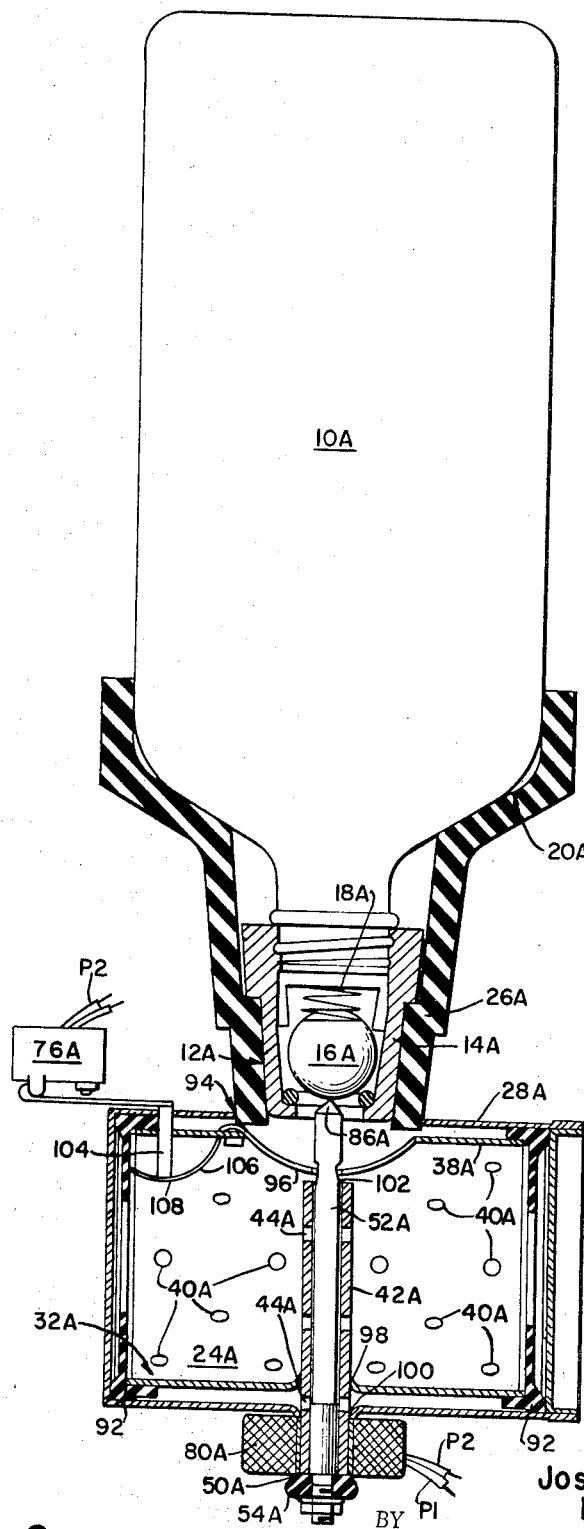

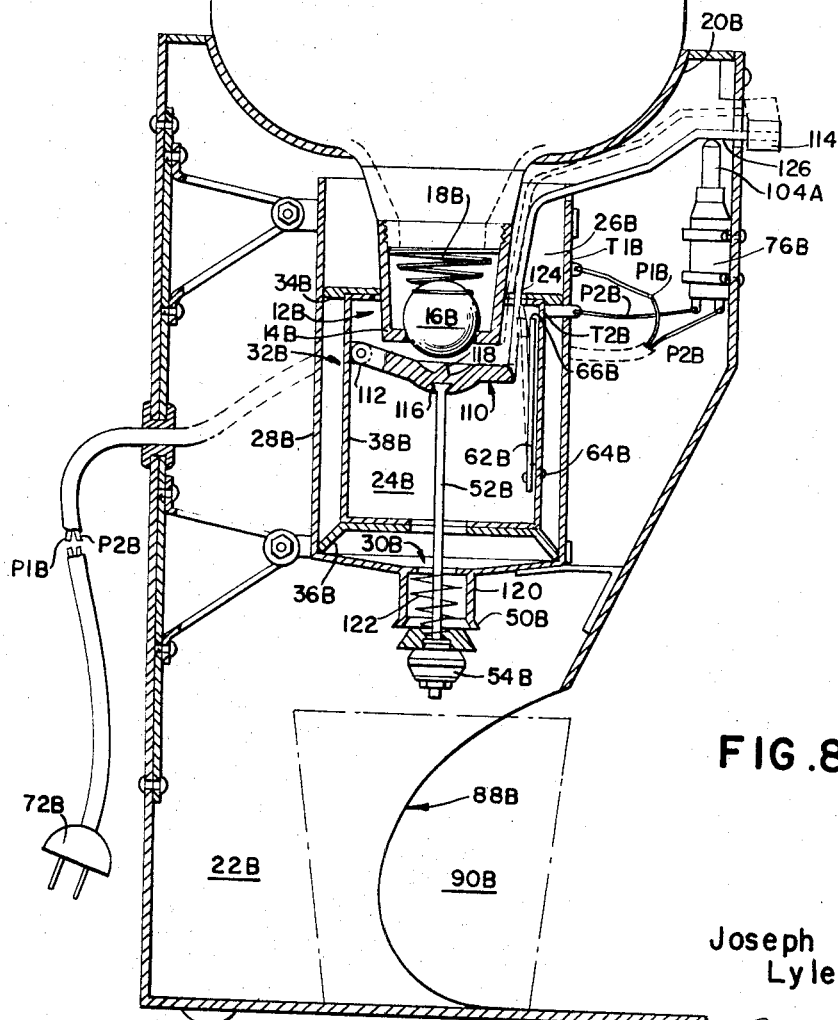
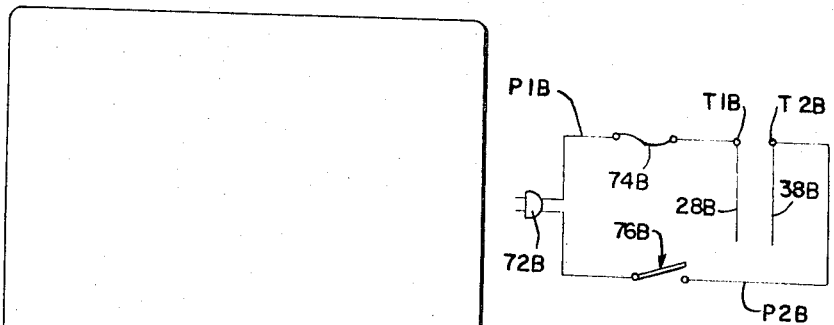
FIG. 9.
FIG. 8.
INVENTORS
Joseph Ladonicski &
Lyle H. Meyer
BY *Birch and Birch*
ATTORNEYS Oct. 31, 1967  J. LADONICZKI ET AL  3,349,964
ELECTRICALLY HEATING AND DISPENSING A METERED
QUANTITY OF FLUENT MATERIAL
Filed Aug. 19, 1965  6 Sheets-Sheet 6

INVENTORS
Joseph Ladonicski &
Lyle H. Meyer

BY Birch and Birch

ATTORNEYS

United States Patent Office 3,349,964
Patented Oct. 31, 1967

3,349,964
ELECTRICALLY HEATING AND DISPENSING A METERED QUANTITY OF FLUENT MATERIAL
Joseph Ladoniczki, P.O. Box 533, Orange City, Fla. 32763, and Lyle H. Meyer, 2531 Norfolk Road, Orlando, Fla. 32803
Filed Aug. 19, 1965, Ser. No. 480,908
14 Claims. (Cl. 222—54)

ABSTRACT OF THE DISCLOSURE

Devices for the rapid heating and dispensing of metered quantities of various liquids are provided which include a metering chamber having coordinated inlet and outlet valves and temperature responsive devices for controlling the valves to close the inlet and open the outlet valves simultaneously upon the occurrence of a predetermined temperature in the liquid. The metering chamber has a conductive outer wall which is an integral part of the heating structure, the latter being adapted for alternating current energization by the use of an inner electrode concentric with the outer conductive wall of the metering chamber and tuned for optimum heating by selectively providing ports therethrough to vary the area thereof.

---

This invention relates to fluid heating apparatus and the like and more particularly, to new and novel controlled electric fluid heating means and apparatus embodying same, the latter including new and novel automatic fluid heating and dispensing means, for dispensing, on demand, metered quantities of heated fluids into a receptacle.

With the present day availability of dehydrated instant foods such as coffee, soups and the like, there exists a long-felt need in the art for water heating and dispensing apparatus which will facilitate the use of such foods, which is foolproof, long lasting, optimally minimum in price and rapid in operation.

It is an object of this invention to provide a new and novel automatic electric fluid heating and dispensing apparatus which obviates the need for an electrical heating element therein.

It is another object of this invention to provide a new and novel automatic electric fluid heating and dispensing apparatus which cannot be damaged should it be energized in the absence of a sufficient supply of fluid therein.

Another object of this invention is to provide a new and novel automatic electric fluid heating and dispensing apparatus having a novel tuned heating and metering chamber, whereby metered quantities of heated fluid can be dispensed therefrom.

Still another object of this invention is to provide a new and novel automatic electric fluid heating and dispensing apparatus having a novel tuned heating and metering chamber, whereby metered quantities of heated fluid can be dispensed therefrom; and including new and novel thermally responsive control means and cooperating dispensing means.

Still another object of this invention is to provide a new and novel electric fluid heating apparatus having optimized characteristics such that it operates effectively at power levels such as those available from automobile batteries.

Yet another object of this invention is to provide a new and novel tuned electric fluid heating apparatus which is adapted for effecting rapid heating of a wide range of fluid volumes.

These and other objects of this invention will become more fully apparent with reference to the following specification and drawings which relate to several preferred embodiments of the present invention.

Figure 4:
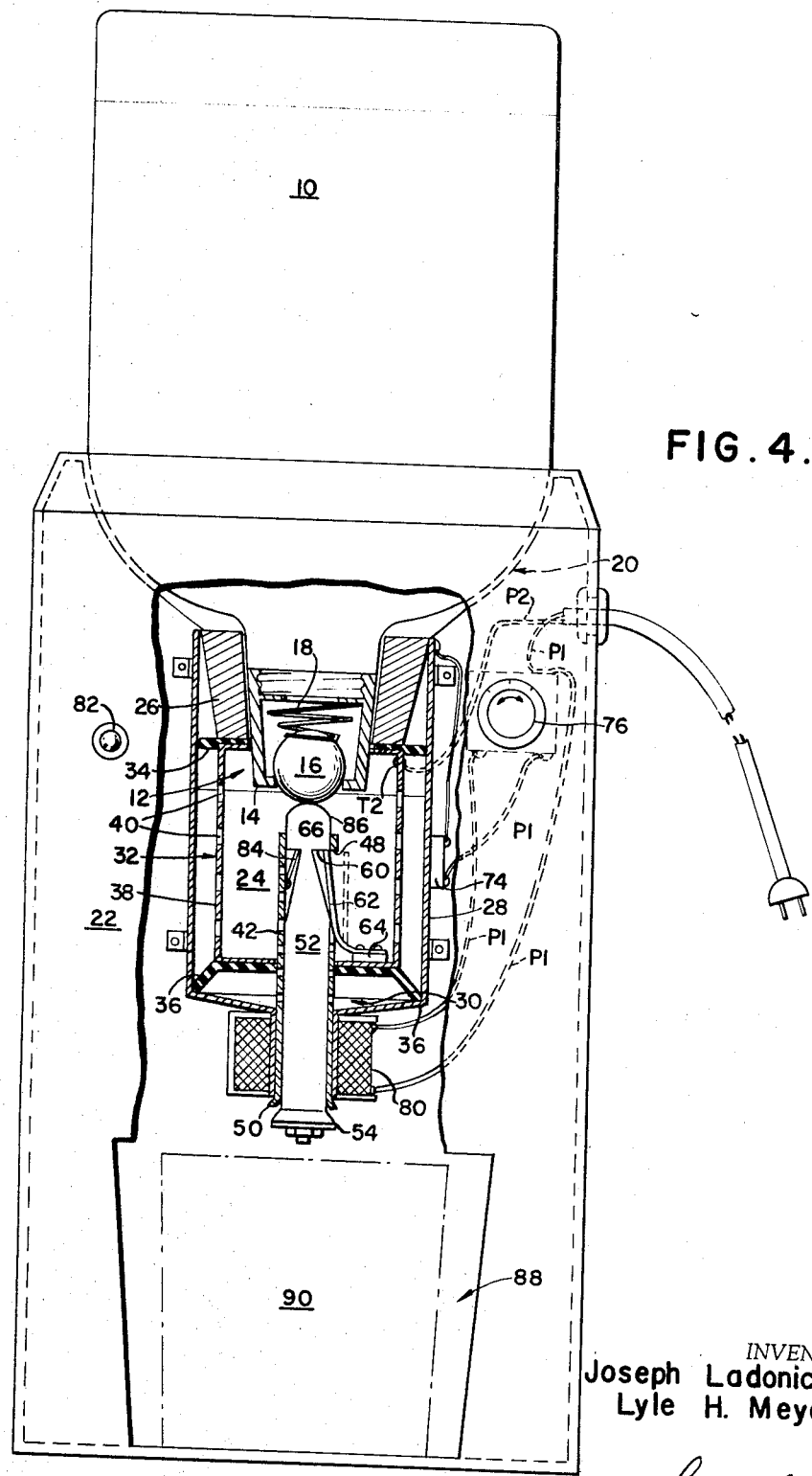
Figure 11:
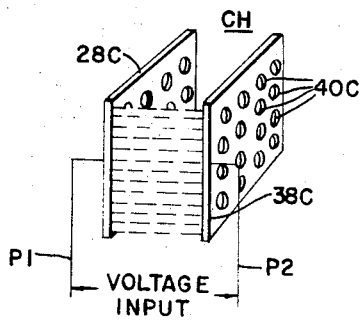
Figure 12:
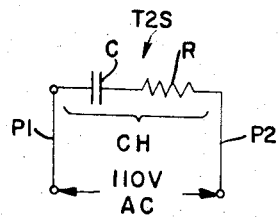
Figure 13:
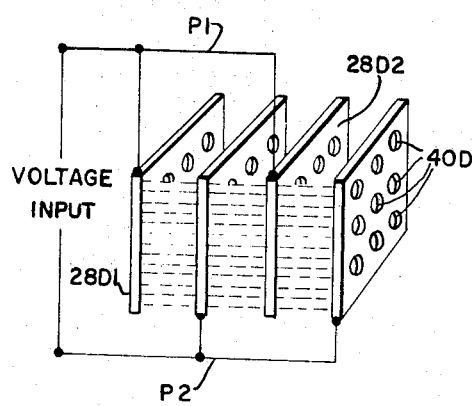
Figure 14:
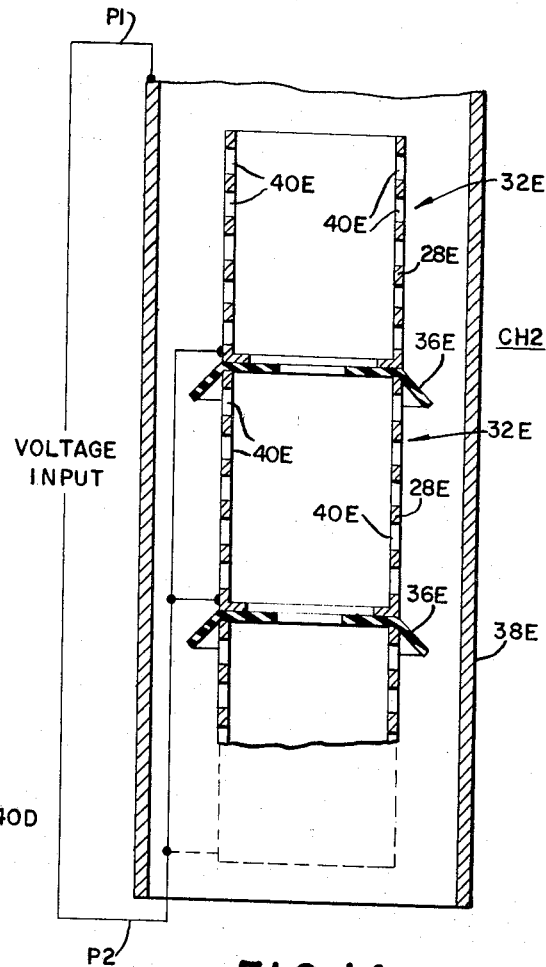
Figure 15:
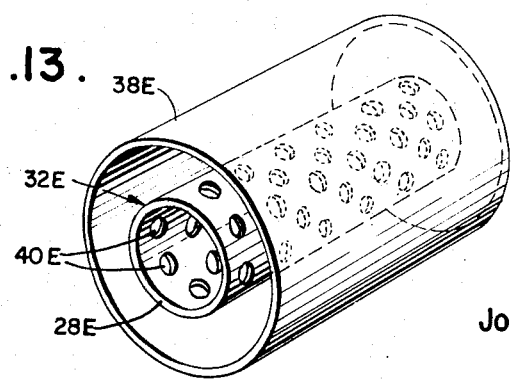

In the drawings:
FIGURE 1 is a top plan view of a heating and metering chamber of the present invention;
FIGURE 2 is an exploded view of the heating, dispensing and control elements of a preferred embodiment of the invention;
FIGURE 3 is a detailed cross-section of the heating and metering chamber taken along line 3—3 of FIGURE 1;
FIGURE 4 is an assembled side elevation of a preferred embodiment of the invention in partial cross-section;
FIGURE 5 is a schematic diagram of a control circuit for the embodiment of FIGURE 4;
FIGURE 6 is a side elevation, in partial cross-section, of another embodiment of the invention;
FIGURE 7 is a schematic diagram of a control circuit for the embodiment of FIGURE 6;
FIGURE 8 is a side elevation, in partial cross-section of a manually actuated, mechanically controlled embodiment of the invention;
FIGURE 9 is a schematic diagram of the energizing circuit for the embodiment of FIGURE 7;
FIGURE 10 is a detail of a modification of the fluid reservoir of the present invention applicable to all of the embodiments herein;
FIGURE 11 is a schematic perspective of a single stage parallel plate fluid heater of the present invention;
FIGURE 12 is an equivalent circuit of the heater of FIGURE 11;
FIGURE 13 is a schematic perspective of a multiple stage parallel plate fluid heater of the present invention;
FIGURE 14 is a schematic cross-section of a multiple stage cylindrical electrode fluid heater of the present invention; and
FIGURE 15 is a schematic perspective of one stage of the multiple stage embodiment of FIGURE 14.

Referring in detail to the drawings, and more particularly to FIGURES 1, 2, 3 and 4, a first embodiment of the present invention is shown as including an upper fluid reservoir 10, holding water in the embodiment now being described, having a bottom outlet assembly 12 comprising an adaptor cap 14, an internal ball valve 16 adapted to be seated internally of the adaptor cap 14 and a biasing spring 18 normally constraining the said ball valve 16 into a seated position on the said adaptor cap 14. The reservoir 10 may be in the shape of a narrow necked bottle, as shown in FIGURE 4, and fits into a substantially conforming upwardly open socket 20 in a main housing 22. The adaptor cap 14 extends into a heating and metering chamber 24 through a receiving socket 26 in the upper end thereof, the said socket 26 being of electrically non-conductive material.

The heating and metering chamber 24 comprises a hollow, cylindrical, electrically conductive, outer shell or electrode 28 having a drain opening 30 in the lower end thereof, and an internally concentric hollow cylindrical inner electrode structure 32 having upper and lower annular insulating bosses 34 and 36, respectively, engaging the interior of the outer shell 28 to fix the said inner electrode structure 32 in a predetermined position with respect to the outer shell 28, whereby a predetermined symmetrical volume is defined between the said inner electrode structure 32 and the outer electrode 28.

The inner electrode structure 32 includes an electrically conductive electrode cylinder 38 extending between the insulating bosses 34 and 36 with a plurality of circular ports 40 extending through the walls thereof for purposes to be hereinafter more fully described.

Alternating current power such as conventional 110 volt house power is connected through power leads P1 and P2, respectively, to the outer and inner electrodes 28 and 38 via terminals T1 and T2, as will hereinafter be more fully described in conjunction with FIGURE 5.

The drain opening 30 in the lower end of the outer electrode 28 is internally threaded to receive a perforated valve shaft sleeve 42 having a raised-thread fitting 44, threadably engageable in the drain opening 30, intermediate its ends. The sleeve 42 is cut away adjacent its upper end to form a socket 46, wedge-shaped in cross section, having a downwardly facing, radially extending detent surface 48 at the upper end of the socket 46. The lower end of the sleeve 42 comprises a flared annular valve seat 50.

Internally concentric with the valve stem sleeve 42 is a hollow valve stem 52 having a valve head 54 on the lower end thereof adapted to engage the annular valve seat 50. The valve stem sleeve and the valve stem 52 include a plurality of radial perforations 56 which serve as flow ports during the dispensing of heated fluid therethrough from the chamber 24.

The upper end of the valve stem 52 includes a turned conical section appearing in cross section as a double wedge-shaped cavity 58 and detent surface 60 conforming with the cavity 46 and detent 48, respectively, of the stem sleeve 42, the two said cavities being in registry when the valve 54 is seated on the annular seat 50.

An upstanding bimetallic latch 62 is mounted on the lower end of the inner electrode 38 on an insulated base 64, adjacent the stem sleeve 42, and extends upwardly into the wedge-shaped cavities 46 and 58 such that its upper end 66 abuts the radial detent surfaces 48 and 60 of the respective cavities when said cavities are in registry.

The bimetal latch 62 is adapted to deflect as the fluid in the heating chamber 24 is brought up to its desired temperature and in the dotted line position shown in FIGURE 4 is disengaged with the detent surfaces 48 and 60 as will be hereinafer more fully described in regard to the operation of the present invention.

Referring jointly to FIGURES 4 and 5, the first power lead P1 extends from a power plug 72 through a thermally responsive switch means 74 to the terminal T1 on the outer electrode 28 via a three position on-off-start switch 76 and either a shunt line 78 or a solenoid winding 80. The second power lead P2 extends from the plug 72 directly to the second terminal T2 on the inner electrode 38. A pilot lamp 82 is connected from the power lead P1 on the load side of the switch means 74 to the power lead P2.

The solenoid winding 80 is mounted around the lower end of the valve stem sleeve 42, the valve stem 52 including ferro-magnetic material.

Referring to FIGURES 2 and 4, the valve stem sleeve 42 is provided with a one way latch spring 84 which cooperates with the detent surface 60 on the valve stem 52, whereby the valve stem 52 is free to reciprocate over a limited axial length of the valve stem sleeve 42 but is prevented from falling out of the sleeve beyond a predetermined displacement of the valve head 54 away from the valve seat 50.

The upper end 86 of the valve stem 52 comprises a valve actuator which is adapted to engage the ball valve 16 in the adaptor cap 14 of the reservoir 10 when the valve 54 is seated on the valve seat 50.

The main housing 22 includes a compartment 88 which is adapted to receive a receptacle or container 90, such as a paper or plastic cup or the like in a position immediately below the valve 54, valve seat 50 and outlet orifice 30, whereby the heated metered quantity of fluid dispensed by the present invention is collected.

Another embodiment of the present inventon is shown as in FIGURES 6 and 7 wherein like elements to FIGURES 1, 2, 3, 4 and 5 bear like numerals with the suffix A.

The longitudinal axis of the outer and inner electrodes 28A and 38A, respectively, are horizontally disposed, annular insulating spacers 92 being utilized at both ends of the heating assembly to provide the proper spacing between the said electrodes.

The receiver socket 26A and the inlet assembly 12A extend into a radially directed inlet opening 94 in the outer electrode 28A which, in turn, is in registry with a similar opening 96 in the inner electrode 38A. Aligned outlet openings 98 and 100 are provided in the inner and outer electrodes 38 and 28, respectively, in diametric opposition with the inlet openings 94 and 96.

The valve stem sleeve 42A is secured in the outlet opening 100 and extends through the outlet 98 into proximity with the inlet openings 94 and 96.

The valve stem 52A is reduced in diameter from the valve 54A to a point 102 above the upper end of the stem sleeve 42A, at which point the stem 52A is enlarged to prevent it from falling through the stem sleeve 42A except in an amount sufficient to permit the valve 54A to unseat from the valve seat 50A.

The upper end 86A of the valve stem 52A is adapted to unseat the ball valve 16A from the adaptor cap 14A when the valve 54A is seated on the valve seat 50A.

The on-off switch 76A is mounted externally of the heating chamber 24A and is actuated by a thrust button 104 extending into the chamber 24A through the upper portions of the outer and inner electrodes 28A and 38A, respectively. A bimetal temperature sensor 106 is mounted on the inner electrode 38A adjacent the thrust button 104 and includes a thermally displaceable free end 108 adapted to engage and displace the thrust button 104 and actuate the on-off switch 76A upon the achievement of a predetermined temperature in the chamber 24A. The switch 76A is only a two-position, on-off switch in this embodiment.

In the control circuit for this embodiment, reference now being made to FIGURE 7, the first power lead P1A extends directly from the power plug 72A through a fuse-type switch 74A to the first terminal T1A on the outer electrode 28A. The second power lead P2A extends from the power plug 72A through the two-position, on-off switch 76A to the second terminal T2A on the inner electrode 38A. The pilot lamp 82A is connected from the power lead P1A on the load side of the fuse 74A to the power lead P2A on the source side of the on-off switch 76A.

The solenoid winding 80A is connected in parallel with the outer and inner electrodes 28A and 38A across the power leads P1A and P2A on the load sides of the fuse 74A and on-off switch 76A, respectively, to complete the control circuit of the embodiment of FIGURES 6 and 7.

An additional preferred embodiment wherein the solenoid actuation of FIGURES 4, 5 and 6 is replaced by mechanical and manual means will now be described with reference to FIGURE 8, like elements in FIGURE 8 to FIGURES 1 through 7 being represented by like numerals bearing the suffix B.

In this embodiment the microswitch 76B is the complete on-off control for the fluid heater and dispenser of the present invention and is mounted, externally of the heating chamber 24B, on the main housing 22B.

A manual actuating and control lever 110 extends substantially horizontally from a pivotal mounting 112 on the inner electrode 38B beneath the ball valve 16B and adaptor cap 14B, thence substantially vertically out of the heating chamber 24B along the inlet assembly 12B and thence substantially horizontally out through a wall of the main housing 22B in proximity with the thrust button actuator 104A of the on-off switch 76B. A suitable handle or knob 114 is provided on the outer tip of the actuating lever 110.

A valve stem 52B, in the form of a solid rod, interconnects the valve head 54B with the actuating lever 110 at a connecting point 116 immediately beneath the ball valve 16B. An integral valve actuating stud 118 is provided on the actuating lever 110, opposite the connecting point 116, which is adapted to unseat the ball valve 16B from the adaptor cap 14B when the valve head 54B is seated on the valve seat 50B.

The valve seat 50B is integral with a cylindrical extension 120 of the outlet opening 30B in the bottom of the outer electrode 28 of the heating assembly, the extension 120 being externally concentric with the valve stem 52B and housing a coil spring 122 adapted to bias the valve 54B away from the valve seat 50B.

The bimetal latch member 62B is mounted on the interior wall of the inner electrode 38B by way of a mounting means 64B and extends upward to a position in which the upper tip 66B thereof is adapted to abut a substantially horizontal detent surface 124 on the substantially vertical portion of the actuating lever 110 in the phantom line position shown for the said bimetal latch member 62B.

A contact portion or land 126 is provided on the actuating lever 110 which is adapted to engage the thrust button 104A of the microswitch 76B and actuate the latter as will be hereinafter more fully described in the description of operation of the present invention.

Referring to FIGURE 10, a modification of the fluid reservoir is illustrated which is applicable to the reservoirs 10, 10A or 10B, respectively, of the various illustrated embodiments of the present invention.

A fluid reservoir 10C is shown as including an extensible flexible connector tube 130 interconnecting the neck of the reservoir 10C with the adaptor cap 14A.

The receiving socket 20C is cut away at one side thereof, whereby the reservoir 10C, by virtue of the extensible and flexible nature of the connector tube 130, may be lifted out of the socket 20C and folded down to a horizontal position to facilitate storage and the like in a compact space without requiring that the reservoir and the rest of the heating and dispensing apparatus be disconnected.

Referring now to FIGURE 11, a single stage parallel plate heating means $C_H$ is shown comprising power input leads P1 and P2, across which a suitable source of A.C. power is connected, the said leads P1 and P2 being connected, respectively, to first and second electrode plates 28C and 38C. The second plate 38C is shown as including a plurality of circular parts 40C and such may be included in either or both of the plates 28C and 38C as required.

As shown in FIGURE 12, the equivalent circuit of the single stage electric heating means $C_H$ is an A.C. impedance Z comprising a resistance R and a capacitance C connected in series across a suitable A.C. source via the power leads P1 and P2. It has been determined that optimum heating rates are effected and acceptable heating currents are drawn by the heating means $C_H$ when the magnitude of the real component R of the A.C. impedance Z is equal to approximately one-half the magnitude of the imaginary component $1/jwc$ (i.e. $Xc$).

In order that the reactive component be equal to twice the resistance component of the impedance Z for a given dielectric medium to be heated, such as water, the area of the plates 28C–38C, the distance therebetween, and the number and size of the flow ports 40C are selected such that the reactive component $Xc$, of the impedance Z, of the heating means $C_H$ is adjusted to the optimum magnitude of approximately twice that of the resistance component R.

i.e., $|R| = \frac{1}{2} |Xc|$

The adding of flow ports 40C serves as the fine adjustment for the value of capacitance once a nominal size and spacing of the plates 28C–38C has been selected for purposes of production.

Referring next to FIGURE 13, the multistage heating means $C_H'$ shown therein includes a number $m$ of parallel plates 28D1, 28D2, 38D1, and 38D2 of equal spacing $a$, plates bearing the prefix 28 being alternately disposed with plates bearing the prefix 38, the said plates 28D1 and 28D2 being connected to the power lead P1 and the said plates 38D1 and 38D2 being connected to the power lead P2.

In the multiple stage embodiment as in the single stage embodiment, the phase angle of the impedance thereof is adjusted by selecting the proper number of flow ports 40D, whereby the reactive component of A.C. impedance with a liquid dielectric present is adjusted to the desired value to effect the desired adjustment of said phase angle.

Referring to FIGURES 14 and 15, a multistage fluid heating means $C_H2$ of the concentric electrode type will now be described, FIGURE 15 illustrating a single stage of the said heating means $C_H2$ and being the electrical equivalent of the cylindrical heating means of FIGURES 1, 2, 3, 4, 5, 6, 7 and 8. Like parts to preceding figures bear like numerals with the suffix E.

The multistage heating means $C_H2$ comprises a single external electrode cylinder 38E inside which are stacked a plurality of internally concentric cylindrical electrodes 28E separated by insulators 36E. The electrodes 28E are electrically connected in parallel across a suitable A.C. voltage source via power leads P1 and P2 and all include the flow ports 40E for the purposes hereinbefore described.

The multistage heater $C_H2$ is particularly advantageous in that if placed with its longitudinal axis vertical, it is self-regulating in response to the level of the fluid therein, stages not having fluid present drawing substantially zero electric power.

Thus, in FIGURES 11 through 15, as described above, there are shown several alternate embodiments of the novel fluid heating means of the present invention which may be adapted to any of the automatic heater units of FIGURES 1–10 and which may also be used for large scale electric heating such as household hot water heaters or industrial and laboratory type applications.

OPERATION

Referring to FIGURES 1, 2, 3, 4 and 5, the operation of the assembled embodiment of FIGURE 4 will now be described.

Assuming that water is the fluid to be heated and dispensed by the present invention, the surface area of the inner electrode 38 is modified according to the number and size of the radial ports 40 until the impedance of the combination of the outer and inner electrodes 28 and 38, respectively, and the water intermediate the said electrodes is at an optimum to produce extremely rapid boiling of the water between the said inner and outer electrodes and thus, provide a chamber full of boiling water in a very short time.

For example, an eight (8) ounce capacity heating chamber 24 full of water can be boiled and dispensed into a receiving cup 90 in less than sixty seconds under the present invention.

The capacitance of the outer and inner electrodes 28 and 38, respectively, and any fluid to be heated is a function of frequency of electrical energization, dielectric constant of the fluid, and the area and relative spacing of the said outer and inner electrodes and thus, proper designs for a wide range of fluids may be readily effected under the present invention.

The wall plug 72 is connected with a suitable source of alternating current (A.C.) power and, assuming the reservoir 10 to be filled or partially filled with water, the on-off switch 76 is manually closed to the "start" position in which the solenoid winding 80 is energized, simultaneously igniting the pilot lamp 82.

With no boiling hot water present in the chamber 24, the bimetal latch member 62 is flexed toward the solid line position shown in FIGURE 4. A.C. current is passed through the solenoid winding 80, drawing the valve stem 52 into the chamber 24 and closing the outlet valve 54 against the valve seat 50. Simultaneously, the ball valve 16 is unseated from the inlet adaptor cap 14 by the upper tip 86 of the valve stem 52, permitting the metering and heating chamber 24 to completely fill with water from the reservoir 10 to a level coinciding with the lower end of the adaptor cap 14.

In this position, the upper tip 66 of the bimetal latch 62 engages the detent surface 60 of the valve stem 52 and latches the valve head 54 in full seated engagement with the valve seat 50, thereby preventing outflow from the chamber 24 and simultneously permitting inflow as defined above.

After the switch 76 is placed in the start position, it is almost immediately thrown to the "on" position in which the solenoid winding 80 is short circuited via the shunt line 78, thus deenergizing the solenoid 80 and maintaining the valve 54 closed below a preselected minimum water temperature via the bimetal latch 62.

Once water fills the space between the outer and inner electrodes 28 and 38, respectively, the impedance is reduced between the electrode plates and because of the tuning provided by the radial ports 40, a high rate of energy transfer is effected to the water which, due to convection currents and turbulence caused by boiling effects circulation of the heated water throughout the entire chamber 24. As the water approaches boiling temperature, the bimetal latch 62 flexes toward the dotted line position shown in FIGURE 4, thereby releasing the valve stem 52 and permitting the valve 54 to open by gravity until stopped by the threads latch spring 84.

Simultaneously, the ball valve 16 closes and the boiling water in a metered quantity determined by the size of the chamber 24 is dispensed into the receptacle or cup 90.

The pilot light will remain on to indicate applied power in the circuit embodiment of FIGURE 5 but may be connected to the load side of the microswitch 76 so that it will only be illuminated when water is being heated in the heating and metering chamber 24. In the latter case, the light will extinguish when water is dispensed into the cup 90.

Referring now to FIGURE 6, the operation of the ball valve 16A, valve stem 52A, valve 54A, valve seat 50A and solenoid 80A are substantially identical with those corresponding elements of FIGURE 4. There is, however, no latching mechanism on the valve stem 52A and the solenoid 80A is the sole holding and motivating means for the valve stem 52A, the said solenoid 80A remaining energized throughout the heating cycle.

The bimetal sensor 106, upon the water in the chamber 24A reaching its boiling point, opens the microswitch 76A via the actuating button 104, de-energizing the solenoid 80A, these elements being connected as previously defined with reference to FIGURE 5.

As soon as the solenoid 80A is de-energized, gravity actuation and opening of the valve 54A results and the water in the chamber 24A is dispensed via the hollow valve stem sleeve 42A.

If the power plug 72A is left connected in this embodiment, cooling of the element 106 will result in recycling of the heating cycle such that a cup of boiling water will be dispensed at a continuous cycled rate.

With reference now to FIGURES 8 and 9, the operation of this embodiment of the invention is initiated, assuming A.C. power is applied through the plug 72, by raising the operating handle 114 and actuating lever 110 to the dotted line position shown, thereby closing on-off switch 76B, by releasing actuator button 104A, closing the valve 54B, opening the ball valve 16B via the actuator 118 and permitting the tip 66B of the bimetal latch 62B to engage the detent surface 124 on the actuating lever 110 in the dotted line position of FIGURE 8.

As the chamber 24B is filled, the water therein is rapidly heated to the boiling point thereby releasing the tip 66B of the bimetal latch 62B due to the temperature responsive deflection of the said latch 62B to the solid line position of FIGURE 8.

The effect of gravity and the biasing spring 122 force the valve 54B off the seat 50B and the heated metered quantity of boiling water is dispensed into the awaiting receptacle 90B.

Simultaneously the valve 16B is closed via the valve spring 18B and the land 126 of the actuating lever 110 engages the thrust button 104A thereby opening the on-off switch 76B and breaking the power circuit.

In any of the foregoing embodiments, should the cut-off switch 76, 76A or 76B fail to operate or should the apparatus be operated inadvertently with an empty reservoir 10, 10A or 10B, respectively, the impedance provided between the outer and inner electrodes 28–38 and 28A–38A or 28B–38B will be so great in the absence of water as to render insignificant any energy transfer thereto from the A.C. power input. Thus, no temperature rise will occur which, therefore, completely obviates the problem of burnout of any heating means whatsoever in the present invention.

Thus, as can be seen from the foregoing specification and drawings, this invention satisfies a long felt need in the art for a foolproof, positive acting, simple, metered and rapid automatic fluid heater and dispenser which cannot be damaged by burnout due to any failures such as fluid supply or controls.

It is to be understood that the several embodiments shown and described herein are for the purpose of example only and are not intended to limit the scope of the appended claims.

What is claimed is:

1. Means heating and dispensing, on demand, metered quantities of fluid comprising fluid reservoir means, fluid receiving means, fluid heating and metering means intermediate said reservoir and receiving means, first valve means intermediate said reservoir and said heating and metering means, second valve means intermediate said heating and metering and said receiving means, first control means for said valve means simultaneously opening said first valve means and closing said second valve means at the initiation of a heating and dispensing cycle and second control means for said valve means, responsive to a preselected fluid temperature in said heating and metering means, simultaneously closing said first valve means and opening said second valve means upon the occurrence of said preselected temperature; wherein said heating and metering means comprises an outer electrode shell defining a metering chamber of predetermined volume, an inner electrode shell symmetrically spaced from and internally coextensive with said outer electrode shell, and means providing an alternating current electrical potential between said electrode shells; and wherein said second control means includes a bimetallic actuating means mounted in said heating and metering means.

2. The invention defined in claim 1, and wherein said reservoir means includes connector means, including said first valve means, extending a predetermined distance into said heating and metering means in the direction of gravity flow therebetween, whereby said reservoir is barometrically controlled to deliver a predetermined metered quantity of fluid to said heating and metering means when said first valve means is opened by said first control means.

3. The invention defined in claim 1, wherein said second valve means includes a valve stem including ferromagnetic material extending into immediate proximity with said first valve means; and wherein said first control means comprises a solenoid winding surrounding said valve stem, a source of electric power and control switch means selectively interconnecting said source to said solenoid winding effecting a magnetically induced displacement of said valve stem into engagement with said first valve means.

4. The invention defined in claim 1, wherein said second valve means includes a valve stem, said valve stem, said first valve means and said second valve means being interengageable for ganged operation; and wherein said second control means comprises bimetallic latch means maintaining said valve stem in a first controlled position below a preselected fluid temperature in said heating and metering means and automatically releasing said stem to a second controlled position upon the occurrence of said preselected fluid temperature.

5. The invention defined in claim 1, wherein said second valve means includes a valve stem, said valve stem, said first valve means and said second valve means being interengageable for ganged operation; wherein said first control means comprises a solenoid winding surrounding said valve stem, a source of electric power and control switch means selectively interconnecting said source to said solenoid winding effecting a magnetically induced displacement of said valve stem into engagement with said first valve means; and wherein said bimetallic actuating means comprises latch means maintaining said valve stem in a first controlled position below a preselected fluid temperature in said heating and metering means and automatically releasing said stem to a second controlled position upon the occurrence of said preselected fluid temperature.

6. The invention defined in claim 1, wherein said second valve means includes a valve stem including ferromagnetic material extending into immediate proximity with said first valve means; and wherein said first control means comprises a solenoid winding surrounding said valve stem, a source of electric power and control switch means selectively interconnecting said source to said solenoid winding effecting a magnetically induced displacement of said valve stem into engagement with said first valve means; and wherein said bimetallic actuating means selectively engages said control switch means in response to a preselected fluid temperature in said heating and metering means to disconnect said source from said solenoid winding at said control switch and permit said valve stem to disengage said first valve means.

7. The invention defined in claim 1, wherein said inlet includes a conforming receiving socket for said reservoir; and wherein said reservoir includes an extensible and flexible connection with said inlet, whereby said reservoir is removable from said socket without being disconnected from said inlet.

8. The invention defined in claim 1, wherein said heating means further includes dielectric bosses intermediate said electrode shells maintaining said electrode shells in fixed relative position.

9. The invention defined in claim 1, wherein said first control means includes selective engergizing means effecting an initial short duration actuation of said first and second valve means to said first control position and said bimetallic actuating means comprises latch means in said chamber engaging and maintaining said valve stem in said first control position when the temperature of the fluid in said chamber is below said preselected temperature and releasing said valve stem to said initial position at said preselected fluid temperature in said chamber.

10. The invention defined in claim 9, wherein said valve stem includes ferromagnetic material, and wherein, said first means comprises a solenoid winding magnetically coupled with said valve stem.

11. The invention defined in claim 1, wherein said valve stem includes ferromagnetic material and wherein said first control means comprises a control switch and a solenoid winding controlled by said switch magnetically coupled with said valve stem and said bimetallic actuating means selectively engages said control switch, automatically precluding energization of said solenoid winding through said control switch when said preselected temperature of the fluid in said chamber has been achieved.

12. The invention defined in claim 1, wherein said means heating and dispensing metered quantities of fluid further includes switch means actuated by said control means precluding the application of electrical energy to said heating means subsequent to a completed heating and dispensing cycle of said automatic means.

13. The invention defined in claim 1, wherein said inner electrode shell includes a plurality of flow parts therethrough.

14. The invention defined in claim 1, wherein said heating means further includes dielectric bosses between said electrode shells maintaining said electrode shells in fixed relative position, and wherein said inner electrode shell includes a plurality of flow ports therethrough.

References Cited
UNITED STATES PATENTS

| | | | |
|---|---|---|---|
| 1,525,508 | 2/1925 | McCormick | 219—292 |
| 2,231,211 | 2/1944 | Halsey et al. | 222—54 X |
| 2,822,112 | 2/1958 | Bremer | 222—146 X |
| 2,912,143 | 11/1959 | Woolfolk | 222—129.4 |
| 2,993,624 | 7/1961 | Crist et al. | 222—54 |
| 3,198,404 | 8/1965 | Welches | 222—504 X |

WALTER SOBIN, *Primary Examiner.*